United States Patent Office 2,781,553
Patented Feb. 19, 1957

2,781,553

SPRAY MOLDING PROCESS

Andrew Anthony Varela, Old Greenwich, Conn., and Howard Tracy Bangs, North Plainfield, N. J., assignors to American Cyanamid Company, New York, N. Y., a corporation of Maine No Drawing. Application March 13, 1953,
Serial No. 342,272

15 Claims. (Cl. 18—60)

This invention relates to a process of molding resinous materials. More particularly this invention relates to a process of molding whereby a durable, protective and decorative design or surface is applied to a fusible thermosetting molding composition.

The surfacing of molding compositions whereby a durable, protective and decorative design or surface is obtained has long been desired. Various methods have been employed to surface molding compositions but no method has been found to be satisfactory for curved as well as flat surfaces. While surfaces may be applied to molding compositions, such properties as water absorption, surface hardness, abrasion resistance, shrinkage, boil resistance, flexural strength and resistance to stoving have been sacrificed. Among the general methods of applying a surface to molding compositions are dusting, dipping, spraying and placing a pill preform of surfacing compound on a core preform and then molding. The dusting technique is utilized in a two-step molding process for glazing the top surface of fairly non-complex shapes such as plates and table tops. By this method, a suitable core material is partially cured, the mold then opened, a layer of surfacing resin dusted on the surface, and the cure of the material then completed. Such a surface, however, does not have adequate durability to resist cracking during thermal stress. In the dipping technique the base materials are preformed and partially cured. The partially cured article is then dipped into a solution of the coating resin, dried until the solvent medium has evaporated and then cured in the usual manner. Good coverage of flat surfaces is obtained but surface coverage is not satisfactory with complex shapes containing curves due to the flow of the resin solution prior to drying. In the spraying technique an aqueous solution of the surfacing resin is sprayed upon a preformed object, dried and then molded. The results when the resin solution is sprayed onto the preform are not completely satisfactory inasmuch as roughness, crazing and cracking occur during the cure of the material due to thermal stress set up between the base material and the coating material or separation of the surface from the base material tends to develop. The coating also fails when surface cracks appear due to flow and spread of the material during the stoving tests. In the pill preform technique the general method is to place a charge in a mold and form a preform. The mold is opened after a set interval and an electronically warmed pill preform is inserted, the mold reclosed and the cure completed. Objects prepared in this manner do not pass the stoving and acid boil test. In the stoving test the object is maintained at an elevated temperature for an extended period, e. g. 77° C. and 8 hours, to test the surface coverage. The acid boil test also tests the surface coverage by placing the object in boiling acid for a certain period, e. g. 1% $H_2SO_4$ for 10 minutes. Due to the shrinkage difference between the base material and the coating material, cracking of the surfaces results. Also, the entire surfacing of the object is not always accomplished.

It is an object of this invention to mold objects possessing a durable, protective and decorative surface coating or design. It is a further object of this invention to produce molded objects possessing a surface coating having increased properties of water resistance, surface hardness, abrasion resistance, shrinkage, boil resistance, flexural strength, and resistance to stoving. An additional object of this invention is to produce a molded compound having increased color stability. These and other objects of our invention will be discussed more fully hereinbelow.

We have found that the above noted and other objects are attained when a resinous product of reaction of an (A) aldehyde, e. g. formaldehyde and an ingredient selected from the group consisting of (B) (1) melamine and (2) a 4,6-diaminotriazine wherein the amino groups attached to the carbon atoms in the 4- and 6- positions are unsubstituted and the carbon atom in the 2-position has attached thereto a particular kind of radical is used in the solution and sprayed on the hot mold.

The 4,6-diaminotriazines, which are reacted with an aldehyde, and the resulting aldehyde-reaction product then placed in solution to be employed in the present invention, may be represented by the following general formula:

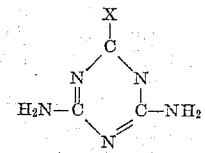

wherein X represents:

(a) A straight or branchd chain, saturated or unsaturated, aliphatic hydrocarbon radical of from 1 to 9 carbon atoms, inclusive, as, for example, acetoguanamine, n-butyroguanamine, isobutyroguanamine, methacryloguanamine, sorboguanamine, n-valeroguanamine, caproguanamine, heptanoguanamine, capryloguanamine, 4-ethyl-2-octenoguanamine, etc., or (b) A cycloaliphatic hydrocarbon radical as in, for example, $\Delta^3$-tetrahydrobenzoguanamine, hexahydrobenzoguanamine, 3-methyl-$\Delta^3$-tetrahydrobenzoguanamine, 3-methyl-hexahydrobenzoguanamine, 3,4-dimethyl-$\Delta^3$-1,2,5, 6 - tetrahydrobenzoguanamine, 3,4 - dimethylhexahydroguanamine, or (c) An aralkyl radical as, for example, phenylacetoguanamine, tolylacetoguanamine, etc., or (d) A mono- or di-substituted amino group in which the N-substituent or substituents are any of the substituents of (a), (b) and (c) above, and, in addition, aryl radicals having not more than 10 carbon atoms, as in, for example, N-butylmelamine, N-phenylmelamine, benzoguanamine, N-tolylmelamine, N-cyclohexylmelamine, N,N-diallylmelamine, N,N-dibenzylmelamine, etc.

Mixtures of two, three or any other number of different 4,6-diaminotriazines of the kind embraced by the above formula and melamine may be used in place of a single such triazine if desired.

While we prefer the use of formaldehyde either in aqueous solution or as paraformaldehyde for condensation with the above-indicated aminotriazines and melamine, other aldehydes or substances yielding an aldehyde, e. g., acetaldehyde, propionaldehyde, valeraldehyde, furfural, trioxane, paraldehyde, benzaldehyde, etc., may be employed. The combined molar ratios of aldehyde to aminotriazine will vary from about 1:1 to about 4:1, the preferred range being from about 1.5:1 to about 2.5:1. To obtain light-colored products, aldehydes should be used that impart little or no color to the product, e. g., formaldehyde.

The temperature of the reaction mass during the resin-forming condensation reaction should be sufficiently high to ensure dissolution of the initial reaction product in the solvent employed. This minimum temperature is about 60° C. The practical upper limit of the reaction temperature is the reflux temperature of the mass when the reaction is carried out at atmospheric pressure. If higher pressures are used, the temperature may be increased, but it should not be above about 200° C. The preferred temperature range is generally from about 80° C. to about 105° C.

The resin solution is sprayed on the hot mold, maintained on said hot mold for a certain period, and then transferred to become an integral part of a base material which is placed in the mold and molded in the usual process. The solution of the resin that is sprayed on the hot mold may be applied to either the male, female or both members of the mold. By this process curved surfaces, as well as flat surfaces, may be coated. A most striking appearance is given to the molded object by incorporating pigments and/or dyes into the solution of the coating resin. Accordingly, it is usual to disperse and/or dissolve pigments and/or dyes into the solution of the coating resin. Such pigments as cadmium yellow, cadmium red, cadmium maroon, titanium oxide, black iron oxide, chrome green, gold, silver, aluminum, copper and pearl essence may be dispersed in the solution to impart any desired color or metallic effect to the molded object. Such dyes as alizarine red, Prussian blue, auramin, naphthol yellow, malachite green may also be dispersed or dissolved in the solution to give any desired color to the solution. Any amount of pigment that will remain in suspension until sprayed may be employed. Also, any amount of dye that remains in solution until sprayed may be utilized. It is preferred, however, that from about 10 to about 20 parts of the mixture of dyes and/or pigments be employed per one hundred parts of solvent. While it is not necessary, from 1 to 5 drops of a wetting agent such as dioctyl sodium sulfosuccinate, diamyl sodium sulfosuccinate, dihexyl sodium sulfosuccinate and the like, may be added to the solution to insure thorough wetting and dispersion of the pigment therein. The melamine-formaldehyde resins, 4,6-diaminotriazine aldehyde reaction products or mixtures thereof that are added to the solution may be varied from about 5 parts to about 35 parts in 100 parts of the solvent. However, it is preferred that from about 20 to about 25 parts of the resin be employed per 100 parts of solvent. Water, alcohol or a mixture of water and any of the lower aliphatic water soluble alcohols such as methanol, ethanol, propanol, 2° and 3° butanol or mixtures thereof serves as the solvent depending upon the resinous material employed. Other solvents which may also find use in the process are benzene, n-butanol, acetone, xylene and the like. While all water may be employed in preparing the resin solution or emulsion, the percentage ratio of water to alcohol in the solution when such a mixture is used may vary from about 80:20 to about 20:80, respectively. If desired, any acid or acid producing substance such as hydrochloric acid, acetic acid or phthalic anhydride and the like may be added as a catalyst to the resin solution to shorten the cure time of the coating film.

The resins utilized in the solution may be prepared as set forth in the following examples. All parts given are parts by weight and should not be considered critical unless otherwise indicated in the appended claims.

RESIN A

A melamine formaldehyde resin was prepared as follows:

Into a suitable reaction vessel was charged 126 parts of melamine and 162 parts of formalin (37% aqueous formaldehyde) and the pH of the solution was adjusted to 7.0 with sodium hydroxide solution. The reaction mixture was then heated to reflux temperature and reacted at this temperature for a period of 20 minutes. The pH of the reaction mixture was then adjusted to 10.0 and the mixture cooled to room temperature at which time the reaction mixture was then spray dried and the resinous material collected.

In the production of the melamine formaldehyde resin from 1 mol to 6 mols of formaldehyde may be reacted per mol of melamine to produce a suitable resin to be employed in the process of our invention. However, it is preferred that from 1.5 mols to 3 mols of formaldehyde per mol of melamine be employed in the preparation of the resin utilized in our process.

RESIN B

A benzoguanamine melamine formaldehyde resin was prepared as follows:

184 parts of benzoguanamine, 192 parts of melamine and 335 parts of formalin (37% aqueous formaldehyde) are introduced into a suitable reaction chamber equipped with thermometer, stirrer, and reflux condenser and mixed for approximately 5 minutes. The pH is adjusted 6.2–6.6 using sodium hydroxide solution. The reaction mixture is then heated to reflux in 25–35 minutes and refluxing is continued until the resin hydrophobes in the kettle. The syrup thus produced is cooled to 60–65° C. in 10–20 minutes. There is then added 289 parts of a 60% aqueous butanol solution thoroughly mixed with the syrup and filtered.

The benzoguanamine melamine formaldehyde resin should have present melamine and benzoguanamine in a mol ratio within the range of 1:2 to 3.3:1, respectively, and preferably 1.6:1, respectively. It is further desired that the ratio of benzoguanamine and melamine to formaldehyde in the resin be within the range of 1:1.5 and 1:2.1, respectively, and preferably 1:1.5, respectively. The employment of such a resin as a surface coating is desirable inasmuch as improved coffee stain resistance is obtained.

RESIN C

An N,N-diallylmelamine-formaldehyde resin is prepared as follows:

|  | Parts | Approx. Molar Ratio |
|---|---|---|
| N,N-diallylmelamine | 1,442 | 1 |
| Aqueous formaldehyde (approx. 37% HCHO) | 1,134 | 2 |
| Aqueous sodium hydroxide (2 N) | 2 |  |

The N,N-diallylmelamine and formaldehyde are charged to a suitable vessel equipped with means for reflux, and the sodium hydroxide is added to give a slurry pH of 8.0. The reaction mixture is heated to reflux in 36 minutes and held at reflux, 98° C. for 55 minutes. At this point the solution becomes turbid and hydrophobic, and has a pH of 8.5. It is vacuum concentrated at 240 mm. mercury pressure until the batch temperature reaches 120° C., and then at 160 mm. mercury pressure for 50 minutes until the temperature reaches 140° C. The resin is dumped onto trays, cooled and ground. A 50% solution of this resin in ethanol is stable at 20°–25° C. for more than 5 hours.

The base material utilized in our invention may be any of the fusible thermosetting resinous materials such as the phenolics, e. g. phenol-formaldehyde resins, phenol-furfural resins; the urea resins, e. g. urea-formaldehyde, urea-melamine-formaldehyde; the triazine resins, e. g. melamine-formaldehyde, benzoguanamine-formaldehyde and polyester molding compounds, aniline formaldehyde resins, epoxy resins, and the like. The base material may be either filled or unfilled. Suitable fillers are such materials as alpha cellulose, wood pulp, chopped rags; wood flour, glass fibers and asbestos. The base material may be charged into the hot mold in any desired manner, as for example, cold granular resinous material, high frequency or otherwise prewarmed pills, and resin impregnated preforms. When the base material is cured in the usual manner, the film of coating resin that has been sprayed onto the hot mold then transfers to and becomes an integral part of the molded object. Molded objects containing this coating are superior in such properties as water absorption, surface hardness, abrasion resistance, shrinkage, boil resistance, flexural strength, and resistance to stoving than are surface coatings applied to a base material by any previously known method.

In the process of our invention the solution of the coating resin containing the desired pigments and dyes is sprayed onto the hot mold maintained at a temperature of about 300–350° F. whereby a film of said material is deposited on the hot mold. The thickness of the film may vary over rather wide limits. When special effects are desired, it is not necessary to spray a film over the entire mold area. At other times when it is desired to show the base material through the film, a clear solution of the resin will be sprayed upon the mold to form a very thin film. For complete coverage of the base material a film thickness varying between about 0.001 and about 0.008 inch is desirable with a film thickness varying between about 0.003 and 0.005 inch preferred. If too thick a film is applied, a tendency for the surface to craze during testing develops. The film is maintained on the hot mold at least long enough for the solvent medium to evaporate therefrom. If articles such as buttons are to be coated with the resin film, the film is maintained on the hot mold for a period of from about 45 to about 60 seconds before the base material is charged into the mold and the curing of the finished product accomplished. If articles such as dinnerware are to be coated with the film, the film is maintained on the hot mold for a period of from 3 to 5 minutes before the base material is charged into the mold and the curing cycle completed. The period of time that the film is maintained on the hot mold is such that the film adheres to the mold but still is soft enough to transfer to and become an integral part of the molded object. As previously stated, the time the film is maintained on the hot mold may be reduced by the addition of an acid or acid producing substance to the resin solution. If the film is maintained on the hot mold for an insufficient time, it will disintegrate during the molding process whereas if the film is maintained on the hot mold for too long a period, the film will cure to such a state that it will not adhere to the molded object. Also, the surface would be rough and dull. As previously stated the film may be sprayed on either the male, the female or both members of the mold.

The molding process employed may be a conventional compression type operation. Any molding process whereby any or all of the hot mold parts may be spray coated with the resin coating film, as for example transfer molding, plunger molding, etc., may be utilized in our invention. Either cold granular, prewarmed or impregnated preforms of a fusible thermosetting resinous material may be employed as the base material. In a typical molding cycle from about 10 to about 15 seconds closing period of the mold with approximately a 5 seconds breathe of the mold is utilized. By employing a high frequency prewarmed pill, a cure time varying from about 2½ to about 3½ minutes at 320° F. with a pressure varying from about 2200 to about 7000 p. s. i. give satisfactory results. The cure time and the mold pressure will, of course, vary depending on the amount of base material charged into the mold. For example, a large dinner plate to be transformed into an infusible and insoluble state will require approximately 2800 p. s. i. mold pressure and 3½ minutes cure time at 320° F. whereas a solid plate will cure at this temperature and time at approximately 2200 p. s. i. mold pressure. Intricate shapes such as cups including a handle therefor require greater mold pressures to cure. In order to expedite the molding process it is conventional to employ a high frequency prewarming device. By placing a pill of the resinous material in a prewarmer operated at temperatures from 200 to 250° F. for a period from approximately 15 to 60 seconds, a reduction in cure time of the molded object is obtained.

Generally, the solution of the pigmented resin sprayed onto the hot mold is uniformly applied. If desired, however, by the utilization of stencils, decorative designs, such as monograms, bands and the like may be applied to the base material. Inasmuch as the film is transferred to and becomes an integral part of the base material, such undesirable features as taste, odor, water resistance, etc. of the base material may be overcome by the process of our invention when otherwise these undesirable properties of the base material prevent the utilization of such materials in molded objects as for example dinnerware.

In order that those skilled in the art may more fully understand the inventive concept herein presented the following examples are set forth. All parts given are parts by weight unless otherwise indicated and should not be considered limitations unless noted in the appended claims.

*Example 1*

An aqueous alcohol solution was prepared by comixing 50 parts ethanol, 50 parts of water, 20 parts of Resin A and 20 parts of a pigment dye mixture containing 10 parts of gold pigment in combination with 3 drops of dioctyl sodium sulfosuccinate as a wetting agent. The resin solution was sprayed onto the male member of a hot mold the temperature of which was 320° F. and was maintained thereon for a period of 5 minutes. A melamine formaldehyde resin pill prewarmed in a high frequency prewarmer for a period of 30 seconds and to a temperature of 220° F. was charged into the mold and the mold closed and the material cured at a temperature of 320° F. for a period of 3½ minutes and at a mold pressure of 2800 p. s. i. Upon removal of the plate from the mold it was found that the film had transferred to and become an integral part of the object. The surfacing was complete and uniform and no failures were observed therein after subjecting the molded object to acid boil and stoving tests.

*Example 2*

When a similar experiment was made employing a pigmented aqueous alcohol solution of Resin B coating, comparable results were obtained.

*Example 3*

Essentially the same as Example 1 with the exception that, instead of the melamine formaldehyde resin, there is used Resin C catalyzed with phthalic anhydride. Similar results are obtained.

We claim:

1. A molding process which comprises spraying a solution of a resinous aldehyde condensate of an aminotriazine having the structural formula:

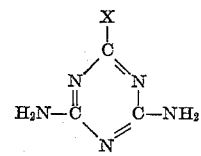

in which X is a substituent containing no more than 10 carbon atoms of the group consisting of aliphatic hydrocarbon radicals containing from 1 to 9 carbon atoms, cycloaliphatic hydrocarbon radicals, aralkyl radicals, and —$NR^1R^2$, wherein $R^1$ and $R^2$ each is a substituent of the group consisting of said hydrocarbon radicals, aryl radicals and hydrogen atoms, on a mold heated to a temperature of at least about 300 degrees Fahrenheit to form essentially a single integral coating on an area of the mold, substantially evaporating the solvent therefrom to produce a film of thickness not substantially exceeding about 0.008 inch, partially and substantially uniformly curing the film, introducing into the mold a charge containing a fusible thermosetting resin of the group consisting of phenolic, urea, triazine, polyester, aniline-formaldehyde and epoxy resins, and thereafter molding and curing the charge and the film to the infusible and insoluble state as an integral article by the application of heat and pressure to the charge and the film with the mold closed; in which process said partially cured film is cured at least to the state in which the film does not disintegrate as a result of resin flow during the subsequent molding operation but not beyond the state in which the film is sufficiently fusible to bond integrally to said charge during the molding operation.

2. A process according to claim 1 in which the aldehyde comprises formaldehyde.

3. A process according to claim 1 in which the condensate comprises a melamine formaldehyde resin.

4. A process according to claim 1 in which the condensate comprises a benzoguanamine melamine formaldehyde resin.

5. A process according to claim 1 in which said charge is an unheated granular resin composition.

6. A process according to claim 1 in which said charge is a prewarmed resin composition.

7. A process according to claim 1 in which the condensate is a melamine formaldehyde resin and said charge is a prewarmed resin composition.

8. A process according to claim 1 in which the condensate is a benzoguanamine melamine formaldehyde resin and said charge is a prewarmed resin composition.

9. A process according to claim 1 in which said charge is a resinous preform.

10. A process according to claim 1 in which the resin solution contains a pigment dispersed therein.

11. A process according to claim 1 in which the resin solution contains a melamine formaldehyde resin, a curing catalyst for said resin and a pigment dispersed therein.

12. A process according to claim 1 in which the resin solution contains a benzoguanamine melamine formaldehyde resin, a curing catalyst for said resin and a pigment dispersed therein.

13. A process according to claim 1 in which said charge comprises a melamine formaldehyde resin.

14. A process according to claim 1 in which the resin solution contains a melamine formaldehyde resin, a curing catalyst for said resin and a pigment dispersed in an aqueous lower aliphatic alcohol, and said charge comprises a prewarmed melamine formaldehyde resin.

15. A process according to claim 1 in which the resin solution contains a benzoguanamine melamine formaldehyde resin, a curing catalyst for said resin and a pigment dispersed in an aqueous lower aliphatic alcohol, and said charge comprises a prewarmed melamine formaldehyde resin.

References Cited in the file of this patent
UNITED STATES PATENTS

| | | |
|---|---|---|
| 1,094,828 | Aylesworth | Apr. 28, 1914 |
| 2,250,958 | Kautter et al. | July 29, 1941 |
| 2,273,700 | Feuerstein | Feb. 17, 1942 |
| 2,285,370 | Staelin | June 2, 1942 |
| 2,479,935 | Johnson | Aug. 23, 1949 |
| 2,481,809 | Barnes | Sept. 23, 1949 |